J. F. DAVIDSON.
MOTION PICTURE APPARATUS.
APPLICATION FILED OCT. 14, 1914.

1,221,515.

Patented Apr. 3, 1917.
6 SHEETS—SHEET 4.

WITNESSES
INVENTOR
JAMES F. DAVIDSON,
BY
ATTORNEYS

UNITED STATES PATENT OFFICE.

JAMES F. DAVIDSON, OF MARLOW, OKLAHOMA.

MOTION-PICTURE APPARATUS.

1,221,515.  Specification of Letters Patent.  Patented Apr. 3, 1917.

Application filed October 14, 1914. Serial No. 866,651.

*To all whom it may concern:*

Be it known that I, JAMES F. DAVIDSON, a citizen of the United States, and a resident of Marlow, county of Stephens, and State of Oklahoma, have made certain new and useful Improvements in Motion-Picture Apparatus, of which the following is a specification.

This invention relates to motion picture apparatus.

An object of the present invention is to provide novel means for intermittently advancing the sensitized picture strip through the optical field of the apparatus and maintaining the same stationary for a definite interval prior to each advancement, the mechanism in question being equally adapted for motion picture cameras or projecting apparatus.

A further object is to provide novel means whereby a spring motor will intermittently advance the picture strip through the optical field of a motion picture apparatus, said means being adapted to hold the strip rigorously stationary intermediate the successive periods of advancement. The means further includes a manually operated release mechanism which is connected and operated by feeding and take-up rollers which direct the picture strip to and from the optical field.

A further object is to provide a novel form of release mechanism for use in connection with motion picture machines, which although being of simple design is adapted to operate at a speed requisite for the proper projection of motion pictures and to perform each advancement of the strip in a sharp and concise manner with the interval between advancements, during which time the strip is held rigorously stationary, relatively great with regard to the time occupied during each successive advancement.

With the foregoing and other objects in view which will appear as the description proceeds, the invention resides in the combination and arrangements of parts, and in the details of construction hereinafter described and claimed, it being understood that changes in the precise embodiment of the invention herein disclosed, can be made within the scope of which is claimed without departing from the spirit of the invention.

In the drawings accompanying this specification and forming a part thereof, the preferable form of my invention is illustrated, in which:—

Fig. 14* is a view taken on the line *a—a* of Fig. 14.

Referring to the drawings in which similar reference numerals designate corresponding parts throughout the several views, the projecting apparatus includes a receptacle or casing 15 in which is positioned the longitudinally extending vertical partition 16 defining the film compartment 17 and rear film actuating mechanism compartment 18. A housing 19 is mounted upon the top of the receptacle and is detachably held thereto by set screws 20 or allied means allowing it to be conveniently removed and rendering the apparatus conveniently portable should the action arise which would so warrant.

Figure 14:
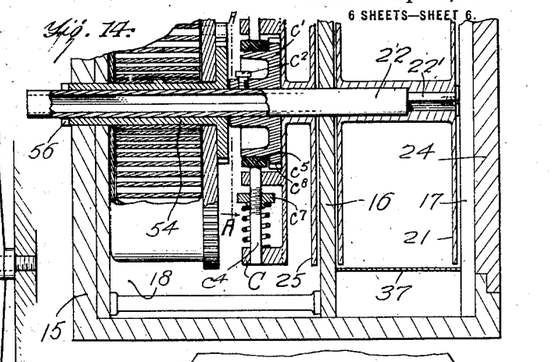
Fig. 14 is a view in longitudinal section of the shaft upon which the spring motor film take-up and steel tape reels are mounted.
Figure 14A:
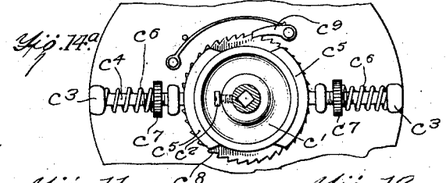

A shaft 22 (see Fig. 14) extends through the compartments of the receptacle 15 and is provided with the free square end 22' upon which the film receiving reel 21 is slidably mounted and constrained to move therewith. The receptacle is provided with a door 24 which when opened exposes the free end 22' of the shaft and allows the take-up or film receiving reel to be quickly detached or replaced thereupon. The film take-up reel is located within the film compartment 17 whereas a second reel 25 is fixedly secured to the shaft 22 by the friction clutch C. The said friction clutch includes a drum $c'$ rigidly secured to the shaft by the set screw $c^2$. One wall of the reel 25 (see Fig. 14$^a$) is provided with the spaced ears $c^3$ through which the sliding bolt $c^4$ extends, the same being provided with the friction shoes $c^5$ engaging the drum $c'$. The bolts are provided with the springs $c^6$ which contact with the nuts $c^7$ to adjust the friction between the shaft 22 and reel 25. In order to positively lock the drum and reel against rotation in one direction the ratchet $c^8$ is provided formed integral with the drum $c'$ and coacting with which is the spring pressed pawl $c^9$ carried by the reel.

Figures 2, 3:
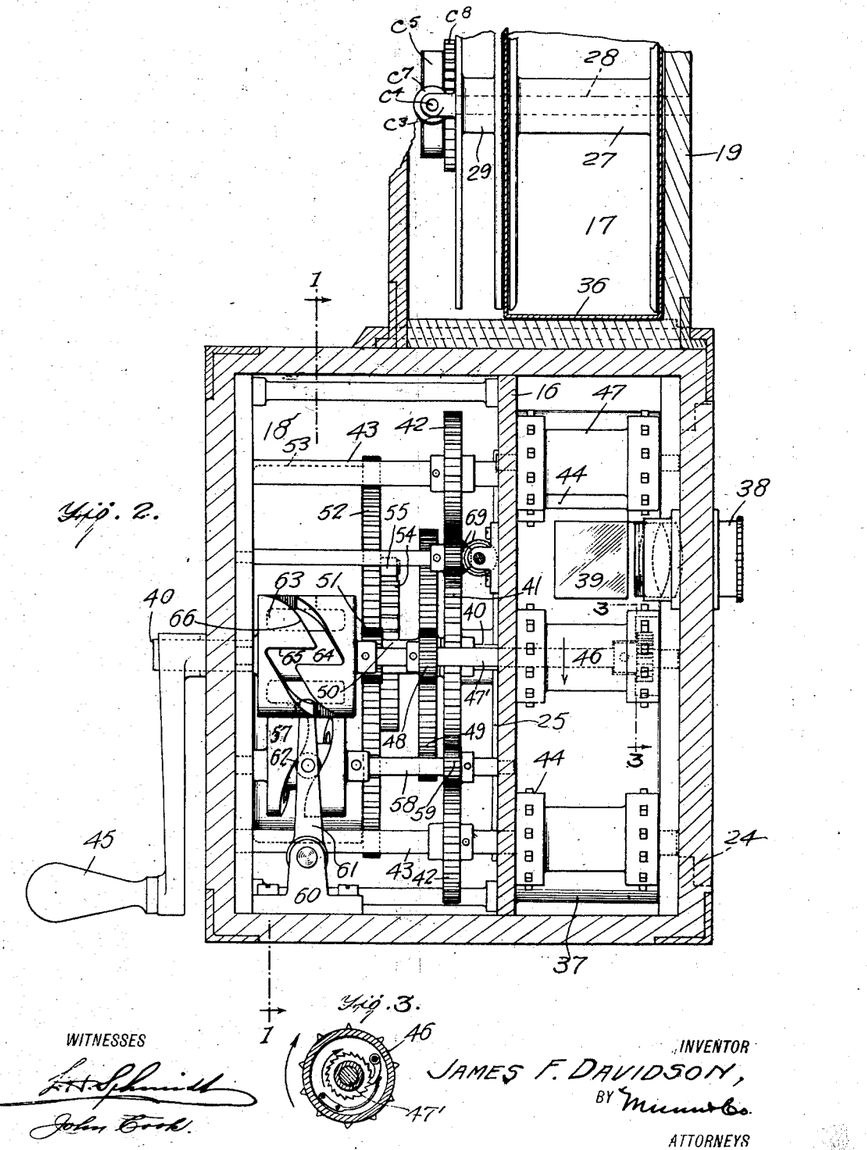
Fig. 2 is a cross sectional view of the foregoing taken upon the line 2—2 of Fig. 1.
Fig. 3 is a detail view in cross section taken on line 3—3 of Fig. 2.
Figure 4:
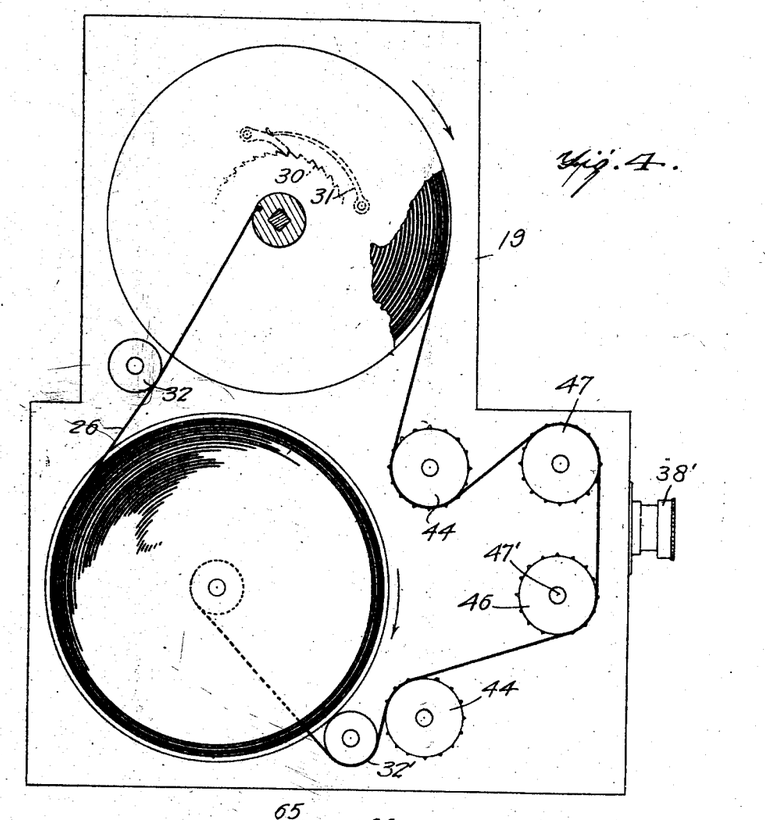
Fig. 4 is a diagrammatic view illustrating the course of the picture strip through the apparatus and also depicting the steel tape by means of which the film take-up reel is rotated and the film subsequently rewound after the completion of the picture projection.

Mounted within the housing 19 and in vertical alinement with the reels 21—25 are the film supplying and steel tape receiving reels 27 and 29 (see Fig. 2). A shaft 28 is provided within the housing upon which the reels are mounted. The film supplying reel 27 is removably secured thereto, the shaft 28 being provided with a square arbor to receive the reel 27, the latter therefore being rigidly secured to the shaft as far as rotation is concerned while the steel tape receiving reel 29 is rotatably mounted on the shaft 28 and effects a uni-directional rotational and frictional engagement therewith by means of the ratchet-friction clutch 30—31 (see Fig. 4) which is similar to the clutch C above described. As will be clearly apparent by referring to Fig. 4, the steel tape or flexible element 26 is wound upon the tape receiving and supplying reels in a direction opposite to that of the picture strip winding upon the reels provided therefor. The unwinding of the picture strip from the film supplying reel will, through the instrumentality of the steel tape induce a corresponding substantially proportional rotation of the film take-up reel, thus rewinding the film upon the take-up reel at a rate substantially equal to the rate at which it is fed from the film supplying reel.

Figure 1:
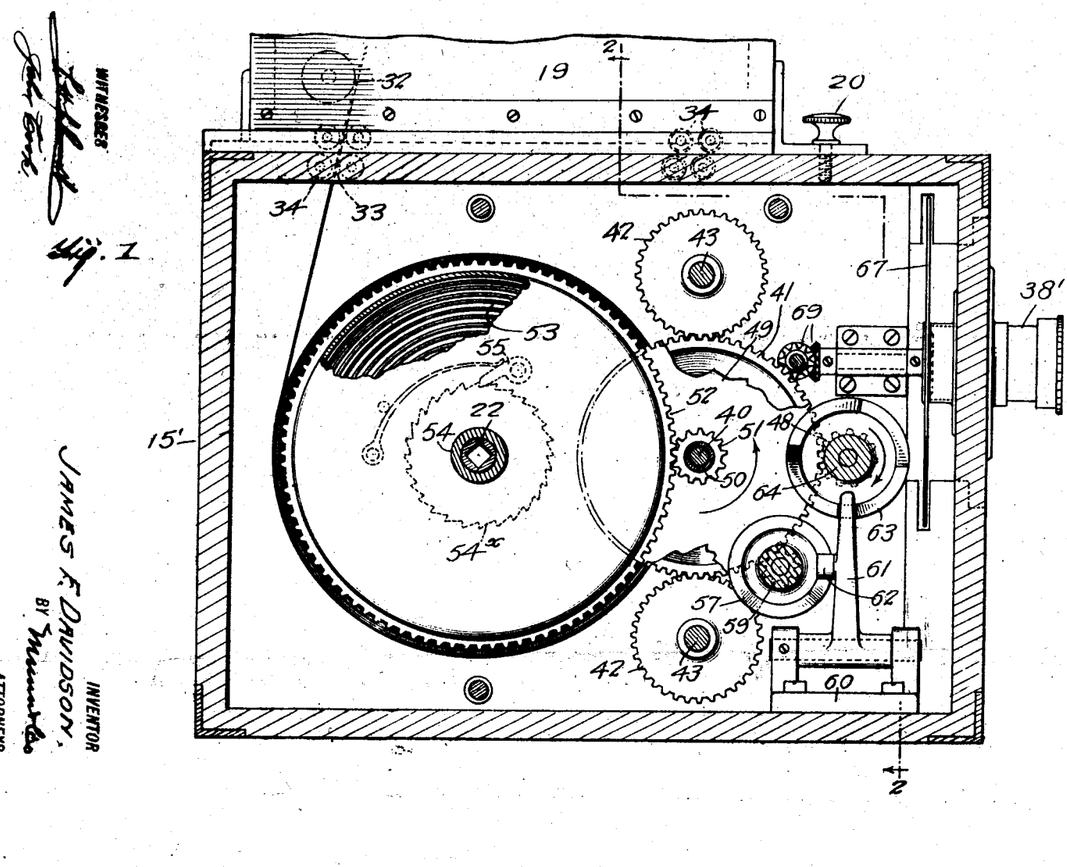
Figure 1 is a view in side section of my novel motion picture apparatus, the section being taken along the line 1—1 of Fig. 2.

The ratchet and pawl connection and frictional engagement between the tape winding reel 29 and the film supplying reel 27 allows the film take-up reel 21 to be manually rotated in order to correct the slight discrepancies met with due to the varying diameters of the rolls of film and tape. The receptacle 15 and the housing 19 are provided with registering slots 33 (see Fig. 1) through which the picture strip and steel tape pass, there being suitable rollers 34 guarding the edges of the slots and preventing undue abrasion of the film and tape which pass therethrough. A roller 32 resiliently bears against the steel tape and in connection with the slack loop 32' (see Fig. 4) within the film and the friction clutches aforementioned further correct and compensate for such discrepancies as met with by the tape drive of the film take-up heel 21.

The shaft 22 upon which the film receiving reel is mounted projects through and beyond the side of the receptacle 15 and allows it to be manually rotated in the reverse direction after the film has been completely wound upon the film receiving reel. This reverse rotation will, by means of the steel tape and reels provided therefor, reversely rotate the tape supplying reel 27 and results in the rewinding of the film providing for its repeated use. Suitable casings 36 and 37, provided with slots therein, encompass the film reels and protect the film or picture strip wound thereon, as is usual in apparatus of the present class.

In order to continuously feed the picture strip to the optical field and remove the same therefrom, a shaft 40 (see Figs. 1 and 2) is provided with the gear 41 secured thereto meshing with and driving the gears 42, which latter are rigidly affixed to the sprocket carrying shafts 43. The sprocket wheels 44 which are mounted upon these shafts are positioned within the film compartment 17 and are adapted to continuously feed the picture strip to, and remove it from, the optical field, upon the continuous manual rotation of the handle 45 with which the shaft 40 is provided and which is located externally of the receptacle.

Coacting with the continuous picture strip moving mechanism is an intermittently advancing device engaging the film and adapted to intermittently move the same across the optical field and hold it rigorously stationary intermediate each advancement. This device includes the sprocket wheel 46 (see Figs. 2 and 4) which is located to one side of the refracting prism and operates in connection with the idle sprocket wheel 47 to hold the picture strip in a flat condition for the proper projection of the image or picture thereon. The sprocket wheel 46 is provided with a ratchet and pawl connection whereby it is secured to the shaft 47' and with the ratchet and pawl so adjusted that sufficient friction will always be present hindering the slipping of the pawl so that when the shaft 47' is driven in a forward direction it will carry the sprocket wheel 46 therewith but at the same time will allow the sprocket wheel 46 to be forcefully reversed when the film is being rewound. The gear 48 (see Figs. 1 and 2) meshes with a gear 49 carried by the jack shaft 50, which latter is provided with a second gear 51 meshing with and driven by the gear 52 of a spring motor 53. The forward movement of the sprocket 46 may be insured by providing the sprocket with an adjustable set screw to be tightened when the forward movement is desired and to be loosened when the reverse movement is desired.

The spring motor includes a hollow shaft 54 which is journaled so as to rotate freely upon the shaft 22 aforementioned. The spring of the motor is rigidly connected to this hollow shaft and is adapted to rotate the gear 52 by means of the ratchet wheel 54ˣ secured to the shaft and the pawl 55 carried by the motor gear. The hollow spring motor shaft projects out on the shaft 22 upon which it rotates and is provided with the key engageable end 56 (see Fig. 14) whereby the motor may be rewound. The spring motor will accordingly exert a constant force upon the shaft 47' tending to continuously rotate the same.

Figure 5:
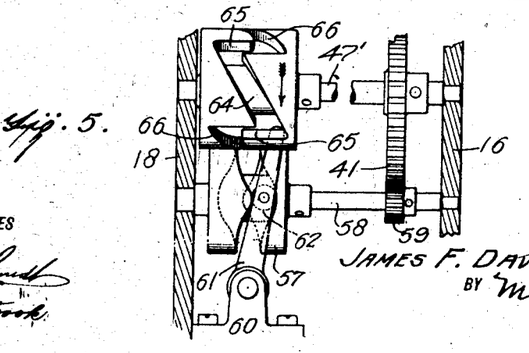
Fig. 5 is a fragmentary detail view of the releasing mechanism whereby the spring motor intermittently advances the picture strip through the optical field.

The movements of the shaft 47' are controlled by an intermittently operating releasing mechanism which includes the slotted cam wheel 57 (see Figs. 1, 2 and 5) mounted upon the cam shaft 58 which in turn is provided with the gear 59 meshing with and driven by the manually operated gear 41. A bracket 60 pivotally supports the oscillating cam actuated lever 61 which is provided with the roller 62 riding within the cam slot and constricted to move in accordance with the contour thereof.

An escapement wheel 63 is rigidly secured to the intermittently advancing sprocket carrying shaft 47' and is provided with the zig-zag slot 64 therein, the slot including spaced laterally extending portions 65 against which the upper extremity of the cam lever 61 is adapted to bear and hold the shaft stationary until such time as the cam lever is moved into the communicating portions of the escapement wheel slot which allows the spring motor to quickly and fractionally rotate the sprocket wheel 46 for the advancement of the film a distance corresponding to the spacing of the pictures thereon.

Figure 15:
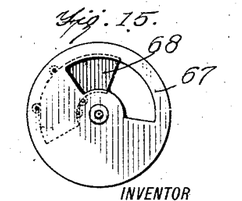
Fig. 15 is a detail view of the shutter.

The angularity of the communicating portions 66 of the escapement slot may be varied according to the movements of the oscillating cam actuated lever 61, the object being to so time the movements of the sprocket wheel 46 that the intervals between advancements will be relatively great with respect to the time required for the advancing of the film. A shutter 67 (see Figs. 1, 6 and 15) provided with the adjustable sectors 68 is mounted in front of the lense 38' and is driven from the manually operated gear 41 through the instrumentality of the spur and beveled gears 69.

Figures 6, 7:
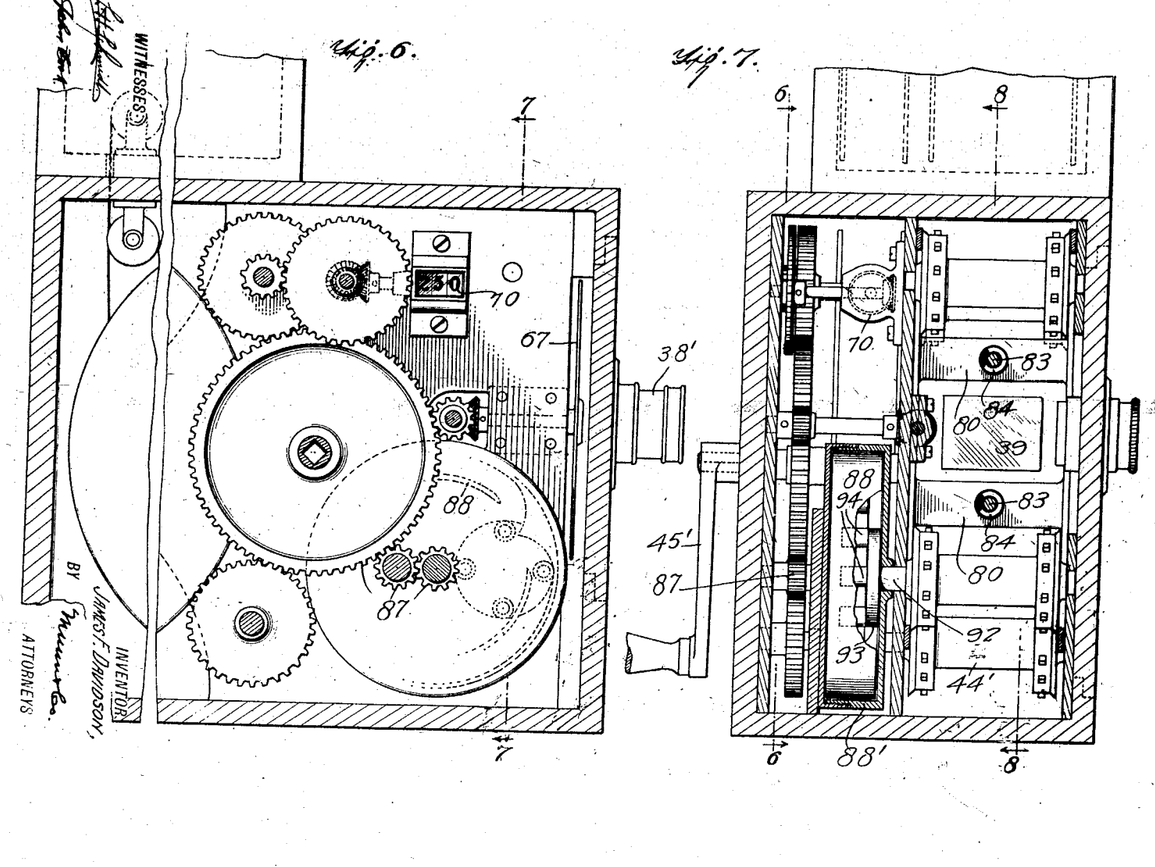
Fig. 6 is a view in side section of a somewhat modified form of apparatus, the modification being largely confined to and embodied in the spring motor releasing mechanism, the plane section being represented by the line 6—6 in Fig. 7.
Fig. 7 is a cross sectional view taken on the line 7—7 of Fig. 6.
Figure 8:
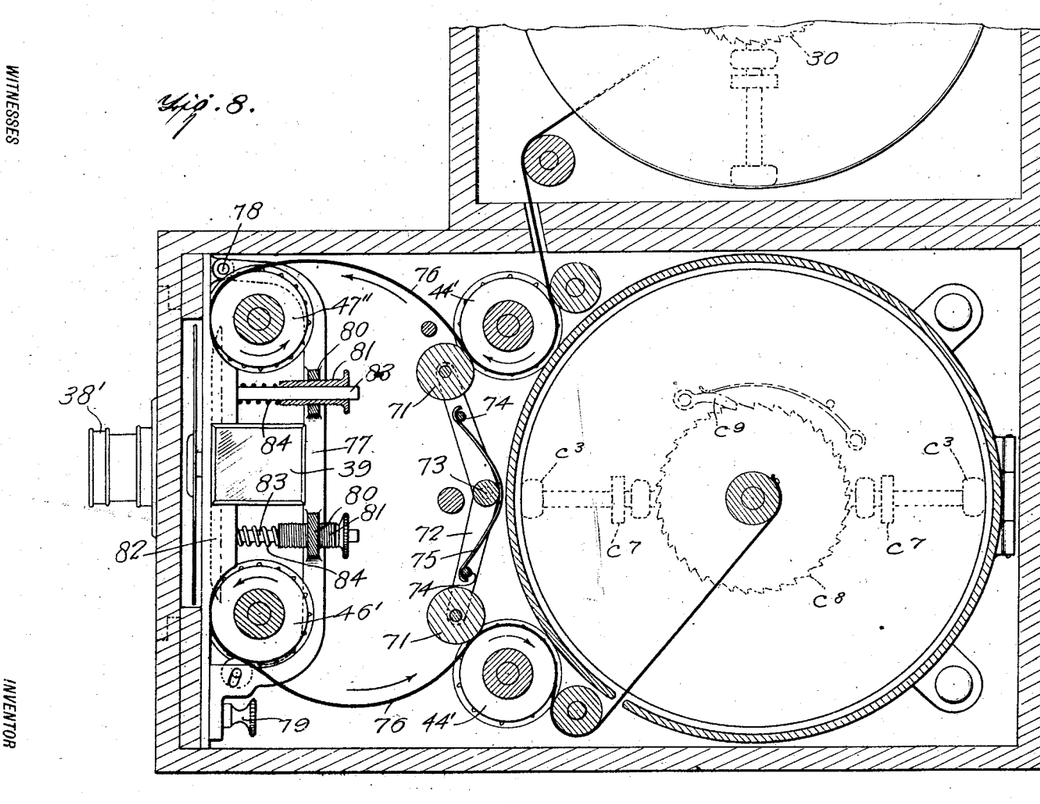
Fig. 8 is a view similar to Fig. 6, the section, however, being taken along the line 8—8 of Fig. 7 and through the film receiving compartment of the apparatus rather than through the compartment in which the mechanism is contained as per Fig. 6.
Figure 9:
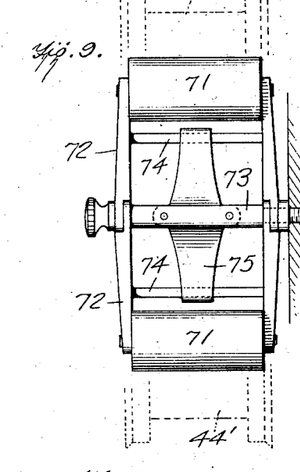
Fig. 9 is a detail view in front elevation of the means whereby the film is held against the feeding and discharge sprockets, providing for slight loops within the film, as illustrated in Fig. 8.
Figure 10:
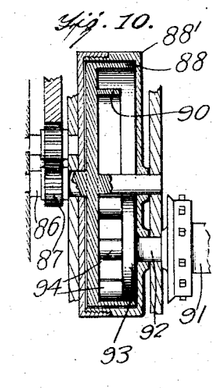
Fig. 10 is a detail view in section of the modified form of spring motor releasing or controlling mechanism.

The apparatus illustrated in Figs. 6 to 13 inclusive is similar to the foregoing and is, as illustrated in Fig. 6, provided with a counter 70 whose driving mechanism is so proportioned that the indications thereon will designate the number of feet of the film which has passed through the camera. Referring particularly to Figs. 8 and 9 it will be apparent that the feeding and take-up sprocket wheels 44' have the rollers 71 bearing thereagainst which are carried by the spring pressed frames 72 rotatably journaled upon the stub shaft 73. The frames include the cross bars 74 against which the leaf spring 75 impinges to thus hold the rollers against the film sprocket wheels. These rollers provide for the slack loops 76 within the picture strip intermediate the intermittently operated advancing sprocket wheel 46' and the guide sprocket wheel 47''.

In order to maintain the film in a taut and flat condition while traveling through the optical field the skeleton frame 77 is pivotally secured, as at 78, above the guide sprocket 47' and is securely locked below the intermittently advancing sprocket wheel 46', by the locking set screw 79, or allied means. The frame carries the apertured ledges 80 through which the adjusting sleeves 81 extend and threadedly engage. A film contacting shoe 82 has the plungers 83 extending therefrom and slidably engaging the adjusting sleeve 81 which in connection with the springs 84 provides for the resilient extension or advancement of the contact shoe so as to bear against the film and exert a resilient as well as an adjustable force thereon.

Figure 11:
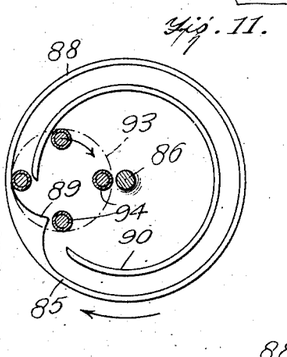
Figs. 11, 12 and 13 are diagrammatic views illustrating the successive positions of the film advancing mechanism throughout a single cycle of operation.
Figure 12:
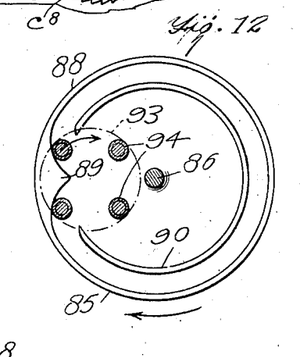
Figure 13:
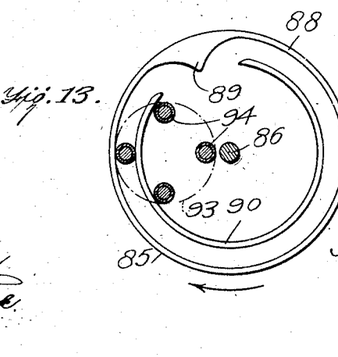

The intermittently advancing mechanism of this latter form of apparatus dispenses with the spring motor and includes a cam like wheel 85 (see Figs. 10 to 13) which is mounted upon a shaft 86 and driven from the manually operated crank 45' through the instrumentality of a suitable gear train 87. The cam wheel 85 includes the laterally extending peripheral rim 88 which is provided with the single inwardly extending tooth 89 which co-acting with the discontinuous spacing flange 90 is adapted to intermittently rotate the film advancing sprocket wheel 91. The sprocket wheel 91 includes the shaft 92 upon which is mounted the wheel 93 which is positioned eccentric with respect to the cam-like wheel 85 and carries the four outstanding cylindrical pins 94. A casing 88' houses the wheels 85—93 and is adapted to receive oil therein allowing the said wheels to run in an oil bath for their efficient rotation. The pins 94 are substantially equal in diameter to the spacing of the flange 90 from the cam rim 88 so that when spaced therebetween the advancing sprocket for the film or picture strip will be held rigorously stationary. The discontinuous flange 90 has its opening symmetrical with respect to the single tooth 89 and so proportioned that as the cam wheel 85 is manually rotated in connection with the operation of the crank handle 45', the single tooth will strike against one of the pins 94 and exert a turning moment upon the wheel 93 fractionally rotating the same in a direction similar to the direction of rotation of the cam wheel 85, releasing one pin from the groove intermediate the rim 88 and flange 90 and positioning the next adjacent pin therein to thus hold the advancing sprocket 91 rigorously stationary for the remaining portion of the cycle. This cyclic operation is illustrated in Figs. 11, 12 and 13, wherein the arrows denote relative rotation of the wheels 85 and 93 and the cyclic manner in which the advancing sprocket wheel 91 is intermittently rotated with its period of rotation relatively small with respect to its period of rest, the same being proportional to the fractional part of a circumference as represented by the arcual extent of the tooth 89.

In this latter form the ratchet and pawl connection of the film advancing sprocket wheel 46 is omitted inasmuch as the spring motor is not present in this form the crank handle may be turned in either direction for the advancement of a film or for its rewinding.

Having thus fully described my invention, what I claim is:—

1. An apparatus of the class described comprising a film supplying reel with a film thereon, a film take-up reel adapted to engage and wind the film thereon, means for unwinding the film from said supplying reel and advancing the same through the optical field of the apparatus, means including a flexible element engaging the said film reels and wound reversely thereon with respect to the film winding adapted to rotate the take-up reel during the unwinding of a film from the film supplying reel and rotating the film supplying reel for the rewinding of the film thereon, said flexible element being restricted to unidirectional movement with the supplying reel, and adapted to be moved freely in the opposite direction.

2. An apparatus of the class described comprising a film supplying reel, a flexible element receiving reel connected thereto and constricted to uni-directional rotation therewith and adapted to rotate freely in the opposite direction, a film take-up reel, and a flexible element supplying reel in engagement therewith, and means for advancing the film strip through the optical field of the apparatus.

3. An apparatus of the class described including an optical field, comprising a film supplying reel, a tape receiving reel, a ratchet and pawl connection therebetween, a film take-up reel, a tape receiving reel connected thereto and constricted to rotate therewith, and means adapted to intermittently advance a film through the optical field of said apparatus.

4. An apparatus of the class described comprising a film supplying reel and film thereon, a tape receiving reel and tape thereon, a ratchet and pawl connection therebetween, a film receiving reel, a tape supplying reel connected thereto, means adapted to engage a film carried by said film reels to propagate the same through the optical field of the apparatus, and resiliently mounted means engaging the film and tape adapted to form slack loops therein.

5. An apparatus of the class described, comprising manually driven film engaging feed and take-up wheels, a film advancing wheel adapted to draw the film through the optical field of the apparatus, a spring motor mechanically connected to said film advancing wheel adapted to exert a continuous torsional force thereupon, an escapement wheel mechanically connected to the film advancing wheel and provided with a zig-zag slot therein, and a cam operated oscillating lever engaging said slot mechanically driven with said feed and take-up film wheels and adapted to intermittently release, for the intermittent rotation of, the said film advancing wheel.

6. A motion picture apparatus comprising a crank actuated shaft, a pair of film feeding and take-up film engaging wheels mechanically connected to and driven by said crank actuated shaft, spaced film engaging film guiding and film advancing wheels, an optical field located therebetween, a rotatably mounted shaft, a film reel slidable and non-rotatably secured thereto, a tape reel affixed to said shaft, a spring motor including a hollow shaft rotatably journaled upon the afore-mentioned shaft, a gear rotatably mounted upon said hollow-shaft, a ratchet and pawl connection between said gear and said hollow shaft, mechanical means connecting the film engaging advancing wheel and said spring motor, an escapement wheel mechanically connected to said film advancing wheel, a cam wheel mechanically connected to said feed and take-up film engaging wheels, and an oscillating cam actuated arm engaged and moved by said cam and engaging a zig-zag slot provided in said releasement wheel for the intermittent releasement and fractional rotation of said film advancing wheel.

JAMES F. DAVIDSON.

Witnesses:
N. B. FILLEBROWN,
ELLIS H. NICKELL.